United States Patent
Hyakudai et al.

[11] Patent Number: 5,920,598
[45] Date of Patent: Jul. 6, 1999

[54] RECEIVING APPARATUS AND RECEIVING METHOD

[75] Inventors: Toshihisa Hyakudai, Chiba; Yasunari Ikeda, Kanagawa, both of Japan

[73] Assignee: Sony Corporation, Japan

[21] Appl. No.: 09/067,651

[22] Filed: Apr. 27, 1998

[30] Foreign Application Priority Data

May 2, 1997 [JP] Japan .................... P09-114712

[51] Int. Cl.⁶ .................... H04L 27/06; H04L 5/06; H04J 11/00
[52] U.S. Cl. .................... 375/316; 375/326; 370/206
[58] Field of Search .................... 375/316, 326, 375/340, 344; 370/206, 203, 480

[56] References Cited

U.S. PATENT DOCUMENTS

| | | | |
|---|---|---|---|
| 5,471,464 | 11/1995 | Ikeda | 370/19 |
| 5,506,836 | 4/1996 | Ikeda et al. | 370/19 |
| 5,771,224 | 6/1998 | Seki et al. | 370/206 |
| 5,838,734 | 11/1998 | Wright | 375/316 |

FOREIGN PATENT DOCUMENTS

WO 94/26046  11/1994  WIPO.
WO 95/20848  8/1995  WIPO.

*Primary Examiner*—Temesghen Ghebretinsae
*Attorney, Agent, or Firm*—Lerner, David, Littenberg, Krumholz & Mentlik, LLP

[57] ABSTRACT

An apparatus and method for receiving an OFDM signal arranged to reproduce correct carriers. I channel data and Q channel data decomposed into subcarrier components by FFT processing are differential-demodulated by a differential demodulation circuit to remove an FFT window phase error and a reproducing carrier phase error. In a differential demodulation circuit, a reproducing carrier frequency error and a phase error dependent on a reproducing clock frequency error are removed and only I-axis data is thereafter output to be stored in a RAM with respect each symbol. A pilot signal selecting data generation circuit supplies the RAM with data which is prepared by suitably shifting pilot signal selecting data used as a reference. Resulting Data read out is accumulated by cumulative addition performed by a cumulative addition circuit. A maximum value detection circuit detects a maximum value of the output from the cumulative addition circuit, and the amount of shift of pilot signal selecting data is stored in a reproducing carrier frequency error storage circuit. The reproducing carrier frequency error storage circuit outputs the amount of shift corresponding to the maximum value.

6 Claims, 12 Drawing Sheets

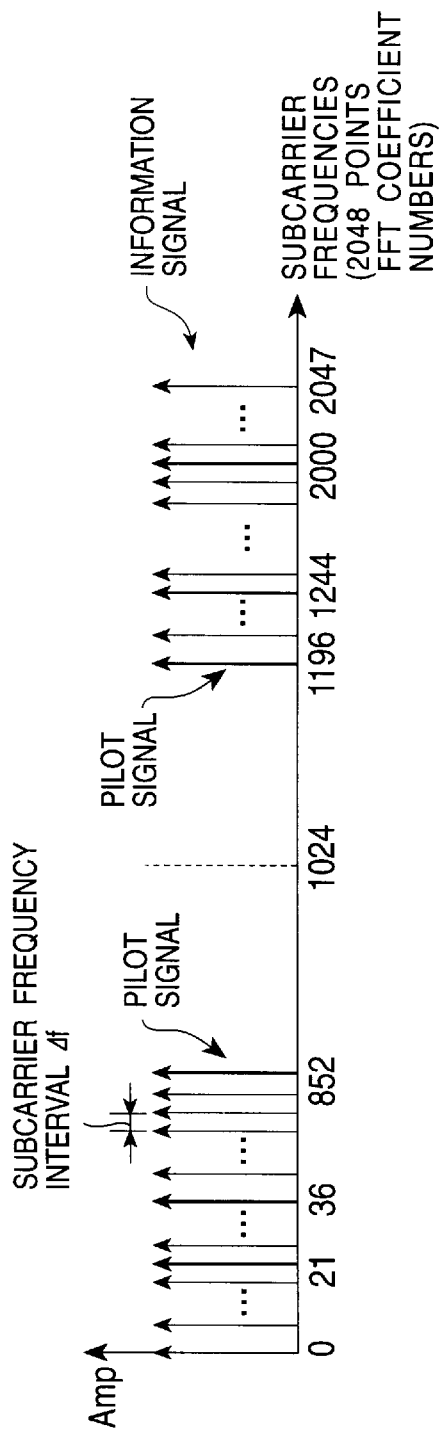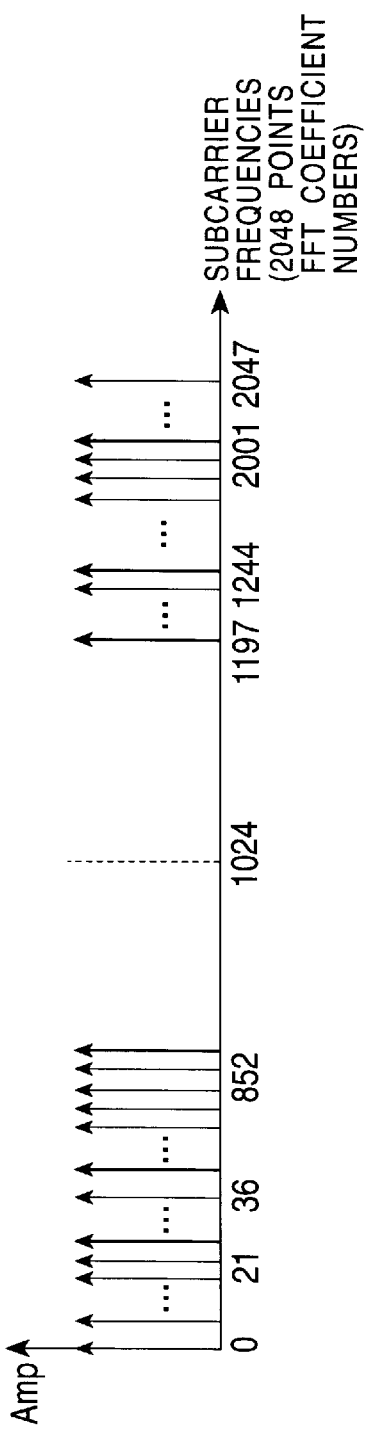

| FIG. 5A | $f_e = -2\Delta f$ | 19 | 34 | - - - | 829 | 850 | 1194 | 1242 | - - - | 1974 | 1998 |
| FIG. 5B | $f_e = -\Delta f$ | 20 | 35 | - - - | 830 | 851 | 1195 | 1243 | - - - | 1975 | 1999 |
| FIG. 5C | $f_e = 0$ | 21 | 36 | - - - | 831 | 852 | 1196 | 1244 | - - - | 1976 | 2000 |
| FIG. 5D | $f_e = \Delta f$ | 22 | 37 | - - - | 832 | 853 | 1197 | 1245 | - - - | 1977 | 2001 |
| FIG. 5E | $f_e = 2\Delta f$ | 23 | 38 | - - - | 833 | 854 | 1198 | 1246 | - - - | 1978 | 2002 |

RECEIVING APPARATUS AND RECEIVING METHOD

BACKGROUND OF THE INVENTION

1. Field of the Invention

The present invention relates to a receiving apparatus and a receiving method and, more particularly, to a receiving apparatus and a receiving method based on an OFDM method.

2. Description of the Related Art

Modulation methods called orthogonal frequency division multiplexing (OFDM) have recently been proposed as a method for transmitting a digital signal. In an OFDM method, a number of subcarriers orthogonal to each other are provided in a transmission band, data items are respectively assigned to the amplitudes and phases of the subcarriers, and digital modulation is performed by phase shift keying (PSK) or quadrature amplitude modulation (QAM). This method uses a reduced band for one subcarrier since the transmission band is divided with respect to a number of subcarriers, so that the modulation speed is reduced. This method, however, achieves the same total transmission speed as other conventional modulation methods because the number of carriers is large.

In this OFDM method, the symbol speed is reduced since a number of subcarriers are transmitted parallel to each other, so that a multipath period relative to the length of a symbol with respect to time can be reduced. Thus, an OFDM method can be expected as a method ensuring high resistance to multipath interference.

Because of the above-described feature, OFDM methods have attracted attention particularly with respect to transmission of digital ground wave signals susceptible to the influence of multipath interference. For example, Digital Video Broadcasting-Terrestrial (DVB-T) is well known as such digital signal transmission by ground waves.

With the recent progress of the semiconductor technology, it has become possible to achieve discrete Fourier transform (hereinafter referred to as FFT (fast Fourier transform)) and discrete inverse Fourier transform (hereinafter referred to as IFFT (inverse fast Fourier transform)) by hardware. If these transforms are used, modulation and demodulation in accordance with an OFDM method can easily be performed. This has also contributed to the increase of attention to OFDM methods.

FIG. 10 is a block diagram showing the configuration of an example of an OFDM receiver. A receiving antenna 101 captures an RF signal. A multiplication circuit 102 calculates the product of the RF signal and a signal which is output from a tuner 103 and which has a predetermined frequency. A bandpass filter 104 extracts the desired IF signal from an output from the multiplication circuit 102. An A/D conversion circuit 105 converts the IF signal extracted by the bandpass filter 104 into a digital signal.

A demultiplexer 106 separates and extracts an I channel signal and a Q channel signal from the digitized IF signal. Lowpass filters 107 and 108 respectively convert the I channel signal and the Q channel signal into baseband signals by removing unnecessary high-frequency components contained in the I channel signal and the Q channel signal.

A complex multiplication circuit 109 removes a carrier frequency error in the baseband signals by a signal of a predetermined frequency supplied from a numerical control oscillation circuit 110, and thereafter supplies the baseband signals to a fast Fourier transform circuit 112, which frequency-decomposes the OFDM time signals to form I and Q channel received data.

A correlation value calculation circuit 113 obtains a correlation value of the OFDM time signal converted into the base band and the OFDM signal delayed by an effective symbol period, and makes the fast Fourier transform circuit 112 start calculating when the correlation value becomes maximized.

A carrier frequency error calculation circuit 114 calculates a carrier frequency error by detecting a frequency power deviation and outputs the calculation result to an addition circuit 111. The addition circuit 111 calculates the sum of the outputs from the carrier frequency error calculation circuit 114 and the correlation value calculation circuit 113 and outputs the calculation result to the numerical control oscillation circuit 110.

A clock frequency reproduction circuit 115 forms a control signal by referring to the I channel data and Q channel data to control the frequency of oscillation of the clock oscillation circuit 116. The clock oscillation circuit 116 forms and outputs a clock signal in accordance with the control signal supplied from the clock frequency reproduction circuit 115.

The operation of the above-described example of the conventional apparatus will next be described.

The multiplication circuit 102 calculates the product of an RF signal captured by the receiving antenna 101 and the signal supplied from the tuner 103 and having a predetermined frequency. The signal output from the multiplication circuit 102 is supplied to the bandpass filter 104, which extracts the IF signal.

The A/D conversion circuit 105 converts the IF signal output from the bandpass filter 104 into a digital signal and supplies the digital signal to the demultiplexer 106. The demultiplexer 106 separates and extracts an I channel signal and a Q channel signal from the digitized signal and supplies these signals to the lowpass filters 107 and 108. The lowpass filters 107 and 108 respectively convert the I channel signal and the Q channel signal into baseband signals by removing aliasing components which are unnecessary high-frequency components contained in the I channel signal and the Q channel signal.

The complex multiplication circuit 109 removes a carrier frequency error in the baseband signals by a signal of a predetermined frequency supplied from the numerical control oscillation circuit 110, and thereafter supplies the baseband signals to the fast Fourier transform circuit 112. The fast Fourier transform circuit 112 frequency-decomposes the OFDM time signal to form I and Q channel received data.

The correlation value calculation circuit 113 calculates a value representing a correlation between the OFDM time signal converted into the base band and the OFDM signal delayed by the effective symbol period and makes the fast Fourier transform circuit 112 start calculating when the correlation value becomes maximized. Consequently, the fast Fourier transform circuit 112 can accurately extract data contained in the I channel signal and Q channel signal sent from the transmitting side.

The correlation value calculation circuit 113 is arranged to control the numerical control oscillation circuit 110 in cooperation with the carrier frequency error calculation circuit 114. Details of the configurations and the operations of these circuits will now be described.

In the example shown in FIG. 10, a carrier frequency error is detected by being decomposed into a component smaller than the subcarrier frequency interval and a component of a unit frequency corresponding to the subcarrier frequency interval. That is, the correlation value calculation circuit 113 calculates a carrier frequency error up to ±½ of the subcarrier frequency interval of the OFDM signal by calculating the correlation value by utilizing the periodicity of the OFDM time signal waveform. Also, the carrier frequency error calculation circuit 114 obtains a frequency error of a unit frequency corresponding to the subcarrier frequency interval by calculating electric power of the frequency components of the OFDM signal output from the fast Fourier transform circuit 112. The sum of the outputs of the correlation value calculation circuit 113 and the carrier frequency error calculation circuit 114 is calculated by the addition circuit 111, and the frequency of oscillation of the numerical control oscillation circuit 110 is controlled according to the calculated value (error value).

FIG. 11 is a diagram showing details of an example of the carrier frequency error calculation circuit 114 shown in FIG. 10. Squaring circuits 203 and 204 shown in FIG. 11 are supplied with I channel signal 201 and Q channel signal 202, square these signals, and output the squares (the values corresponding to the electric power of carriers). An addition circuit 205 calculates the sum of the outputs of the squaring circuits 203 and 204 and outputs the calculation result. A difference calculation circuit 206 divides the signal corresponding to the power of the frequencies output from the addition circuit 205 into two regions (regions A and B), calculates the total power in each region, subtracts the power in one region (region A) from that in the other region (region B), and outputs the subtraction result. An averaging circuit 207 sums up the difference values output from the difference calculation circuit 206 with respect to several symbols, divides the sum by the number of symbols, and outputs the average of the differences.

The operation of this example will next be described with reference to FIG. 12A to 12C.

FIG. 12A shows placement (spectrum) of signals output from the fast Fourier transform circuit 112 with respect to frequencies in a situation where the frequency of oscillation of the numerical control oscillation circuit 110 (reproducing carrier frequencies) is correctly set. As shown in this diagram, data processed by N-points fast Fourier transform is formed of 0 to (N−1) subcarriers. If two regions on the opposite sides of a center N/2 are A and B, N/2 subcarriers are contained in each region.

As shown in FIG. 12A, in the case where the frequencies of reproducing carriers are correctly controlled, the numbers of subcarriers respectively placed in the regions A and B are equal to each other, so that the powers of subcarriers in the regions A and B are equal to each other. FIG. 12B shows placement of signals output from the fast Fourier transform circuit 112 with respect to frequencies in a situation where signals in the base band are demodulated with reproducing carrier frequencies having a frequency error corresponding to one subcarrier frequency interval (see FIG. 4A). In this example, the numbers of subcarriers respectively placed in the regions A and B are not equal to each other, so that the powers in the two regions are different.

In the conventional art shown in FIG. 11, a reproducing carrier frequency error is detected based on the above-described principle.

That is, the squaring circuits 203 and 204 respectively square the I channel signal and the Q channel signal to obtain the powers of these signals. The addition circuit 205 calculates the sum of the outputs of the squaring circuits 203 and 204 and outputs the calculation result to the difference calculation circuit 206. The difference calculation circuit 206 outputs the power value obtained by subtracting the total power of subcarriers in the region B from the total power of subcarriers in the region A (the difference between the powers in the regions A and B) in the power of subcarriers output from the addition circuit 205.

If reproducing is performed with correct reproducing carrier frequencies as shown in FIG. 12A, the powers of subcarriers in the regions A and B are equal to each other and, accordingly, the output of the differential calculation circuit 206 is zero. On the other hand, if reproducing carrier frequencies have an error corresponding to one subcarrier frequency interval as shown in FIG. 12B, the difference between the powers of subcarriers in the regions A and B corresponds to one subcarrier component.

The average circuit 207 obtains and outputs the average (average of power differences) 208 of outputs from the difference calculation circuit 206 corresponding to several symbols in order to eliminate the influence of noise or the like contained in the signals. The numerical control oscillation circuit 110 changes the oscillating frequency according to the output of the average circuit 207. Consequently, the oscillating frequency of the numerical control oscillation circuit 110 is maintained at a predetermined frequency by the feedback loop formed by the carrier frequency error calculation circuit 114 and the correlation value calculation circuit 113.

The method of dividing subcarriers pertaining to one symbol period in two regions and obtaining an error in reproducing carrier frequencies from the difference between the powers thereof ensures that, if, for example, noise uniform in power through the entire frequency band is mixed in the received signal, the influence of noise will be removed by averaging. However, if noise not uniform with respect to frequencies is mixed due to multipath interference or the like as shown in FIG. 12C, the power balancing itself is variable, so that an error in reproducing carrier frequencies cannot be detected.

SUMMARY OF THE INVENTION

In view of the above-described circumstances, an object of the present invention is to provide a receiving apparatus and a receiving method arranged to reproduce correct carriers from an OFDM signal received under the influence of multipath interference or the like.

To achieve the above-described object, according to a first aspect of the present invention, there is provided a receiving apparatus comprising conversion means for performing discrete Fourier transform of an OFDM signal, first storage means for storing data obtained by the conversion means, first computation means for computing a phase difference between data at least one symbol before stored in the first storage means and data newly obtained by the conversion means, second storage means for storing phase difference data obtained by the first computation means, second computation means for further computing a phase difference between the phase difference data at least one symbol before stored in the second storage means and phase difference data newly computed by the first computation means, extraction means for extracting an I-axis component of phase difference data output from the second computation means, estimation means for estimating an error in pilot signals contained in the I-axis component extracted by the extraction means from the original frequencies, and adjustment means for adjusting the frequencies of reproducing carriers according to the error in the pilot signals from the original frequencies estimated by the estimation means.

According to a second aspect of the present invention, there is provided a receiving method comprising a conversion step of performing discrete Fourier transform of an OFDM signal, a first storage step of storing data obtained in the conversion step, a first computation step of computing a phase difference between data at least one symbol before stored in the first storage step and data newly obtained in the conversion step, a second storage step of storing phase difference data obtained in the first computation step, a second computation step of further computing a phase difference between the phase difference data at least one symbol before stored in the second storage step and phase difference data newly computed in the first computation step, an extraction step of extracting an I-axis component of phase difference data output in the second computation step, an estimation step of estimating an error in pilot signals contained in the I-axis component extracted in the extraction step from the original frequencies, and an adjustment step of adjusting the frequencies of reproducing carriers according to the error in the pilot signals from the original frequencies estimated in the estimation step.

According to a third aspect of the present invention, there is provided a receiving apparatus comprising conversion means for performing discrete Fourier transform of an OFDM signal, first storage means for storing data obtained by the conversion means, first computation means for computing a phase difference between data at least one symbol before stored in the first storage means and data newly obtained by the conversion means, second storage means for storing phase difference data obtained by the first computation means, second computation means for further computing a phase difference between the phase difference data at least one symbol before stored in the second storage means and phase difference data newly computed by the first computation means, extraction means for extracting an I-axis component of phase difference data output from the second computation means, second extraction means for extracting phase difference data supposed to be pilot signals from the I-axis component extracted by the extraction means, addition means for performing cumulative addition of the phase difference data extracted by the second extraction means, and control means for controlling the frequencies of carriers so that a calculation result obtained by the addition means is equal to or larger than a predetermined value.

According to a fourth aspect of the present invention, there is provided a receiving method comprising a conversion step of performing discrete Fourier transform of an OFDM signal, a first storage step of storing data obtained in the conversion step, a first computation step of computing a phase difference between data at least one symbol before stored in the first storage step and data newly obtained in the conversion step, a second storage step of storing phase difference data obtained in the first computation step, a second computation step of further computing a phase difference between the phase difference data at least one symbol before stored in the second storage step and phase difference data newly computed in the first computation step, an extraction step of extracting an I-axis component of phase difference data output in the second computation step, a second extraction step of extracting phase difference data supposed to be pilot signals from the I-axis component extracted in the extraction step, an addition step of performing cumulative addition of the phase difference data extracted in the second extraction step, and a control step of controlling the frequencies of carriers so that a calculation result obtained by the addition means is equal to or larger than a predetermined value.

In the receiving apparatus according to the first aspect of the present invention, the conversion means performs discrete Fourier transform of an OFDM signal; the first storage means stores data obtained by the conversion means; the first computation means computes a phase difference between data at least one symbol before stored in the first storage means and data newly obtained by the conversion means; the second storage means stores phase difference data obtained by the first computation means; the second computation means further computes a phase difference between the phase difference data at least one symbol before stored in the second storage means and phase difference data newly computed by the first computation means; the extraction means extracts an I-axis component of phase difference data output from the second computation means; the estimation means estimates an error in pilot signals contained in the I-axis component extracted by the extraction means from the original frequencies; and the adjustment means adjusts the frequencies of reproducing carriers according to the error in the pilot signals from the original frequencies estimated by the estimation means. For example, the conversion means performs discrete Fourier transform of an OFDM signal; the first storage means stores data in a frequency region obtained; the first computation means computes, by differential demodulation, a phase difference between data at least one symbol before stored in the first storage means and data newly obtained by the conversion means; the second storage means stores phase difference data obtained by the first computation means; the second computation means further computes, by differential demodulation, a phase difference between the phase difference data at least one symbol before stored in the second storage means and phase difference data newly computed by the first computation means; the extraction means extracts an I-axis component of phase difference data output from the second computation means; the estimation means estimates an error in pilot signals contained in the I-axis component extracted by the extraction means from the original frequencies based on data prepared by suitably shifting the original pilot signals by a predetermined frequency; and the adjustment means adjusts the frequencies of reproducing carriers according to the error in the pilot signals from the original frequencies estimated by the estimation means.

In the receiving method according to the second aspect of the present invention, discrete Fourier transform of an OFDM signal is performed in the conversion step; data obtained in the conversion step is stored in the first storage step; a phase difference between data at least one symbol before stored in the first storage step and data newly obtained in the conversion step is computed in the first computation step; phase difference data obtained in the first computation step is stored in the second storage step; a phase difference between the phase difference data at least one symbol before stored in the second storage step and phase difference data newly computed in the first computation step is further computed in the second computation step; an I-axis component of phase difference data output in the second computation step is extracted in the extraction step; an error in pilot signals contained in the I-axis component extracted in the extraction step from the original frequencies is estimated in the estimation step; and the frequencies of reproducing carriers are adjusted in the adjustment step according to the error in the pilot signals from the original frequencies estimated in the estimation step. For example, discrete Fourier transform of an OFDM signal is performed in the conversion step; data obtained in the conversion step is stored in the first storage step; a phase difference between data at least one symbol before stored in the first storage step and data newly obtained in the conversion step is computed by differential demodulation in the first computation step; phase difference data obtained in the first computation step is stored in the second storage step; a phase difference between the phase difference data at least one symbol before stored in the second storage step and phase difference data newly computed in the first computation step is further computed by differential demodulation in the second computation step; an I-axis component of phase difference data output in the second computation step is extracted in the extraction step; an error in pilot signals contained in the I-axis component extracted in the extraction step from the original frequencies is estimated in the estimation step based on data prepared by suitably shifting the original pilot signals by a predetermined frequency; and the frequencies of reproducing carriers are adjusted in the adjustment step according to the error in the pilot signals from the original frequencies estimated in the estimation step.

In the receiving apparatus according to the third aspect of the present invention, the conversion means performs discrete Fourier transform of an OFDM signal; the first storage means stores data obtained by the conversion means; the first computation means computes a phase difference between data at least one symbol before stored in the first storage means and data newly obtained by the conversion means; the second storage means stores phase difference data obtained by the first computation means; the second computation means further computes a phase difference between the phase difference data at least one symbol before stored in the second storage means and phase difference data newly computed by the first computation means; the extraction means extracts an I-axis component of phase difference data output from the second computation means; the second extraction means extracts phase difference data supposed to be pilot signals from the I-axis component extracted by the extraction means; the addition means performs cumulative addition of the phase difference data extracted by the second extraction means; and the control means controls the frequencies of carriers so that a calculation result obtained by the addition means is equal to or larger than a predetermined value. For example, the conversion means performs discrete Fourier transform of an OFDM signal; the first storage means stores a one-symbol unit of data obtained by the conversion means; the first computation means computes, by differential demodulation, a phase difference between data at least one symbol before stored in the first storage means and data newly obtained by the conversion means; the second storage means stores a one-symbol unit of phase difference data obtained by the first computation means; the second computation means further computes, by differential demodulation, a phase difference between the phase difference data at least one symbol before stored in the second storage means and phase difference data newly computed by the first computation means; the extraction means extracts an I-axis component of phase difference data output from the second computation means; the second extraction means extracts phase difference data supposed to be pilot signals from the I-axis component extracted by the extraction means; the addition means performs cumulative addition of the phase difference data extracted by the second extraction means ; and t he control means control s the frequencies of carriers so that a calculation result obtained by the addition means is equal to or larger than a predetermined value.

In the receiving method according to the fourth aspect of the present invention, discrete Fourier transform of an OFDM signal is performed in the conversion step; data obtained in the conversion step is stored in the first storage step; a phase difference between data at least one symbol before stored in the first storage step and data newly obtained in the conversion step is computed in the first computation step; phase difference data obtained in the first computation step is stored in the second storage step; a phase difference between the phase difference data at least one symbol before stored in the second storage step and phase difference data newly computed in the first computation step is further computed in the second computation step; an I-axis component of phase difference data output in the second computation step is extracted in the extraction step; phase difference data supposed to be pilot signals is extracted in the second extraction step from the I-axis component extracted in the extraction step; cumulative addition of the phase difference data extracted in the second extraction step is performed in the addition step; and the frequencies of carriers is controlled in the control step so that a calculation result obtained by the addition means is equal to or larger than a predetermined value. For example, discrete Fourier transform of an OFDM signal is performed in the conversion step; a one-symbol unit of data obtained in the conversion step is stored in the first storage step; a phase difference between data at least one symbol before stored in the first storage step and data newly obtained in the conversion step is computed by differential demodulation in the first computation step; a one-symbol unit of phase difference data obtained in the first computation step is stored in the second storage step; a phase difference between the phase difference data at least one symbol before stored in the second storage step and phase difference data newly computed in the first computation step is further computed by differential demodulation in the second computation step; an I-axis component of phase difference data output in the second computation step is extracted in the extraction step; phase difference data to be as pilot signals is extracted in the second extraction step from the I-axis component extracted in the extraction step; cumulative addition of the phase difference data extracted in the second extraction step is performed in the addition step; and the frequencies of carriers is controlled in the control step so that a calculation result obtained by the addition means is equal to or larger than a predetermined value.

BRIEF DESCRIPTION OF THE DRAWINGS

FIGS. 4A and 4B are diagrams showing frequency patterns of an OFDM signal;

FIGS. 5A through 5E are diagrams showing an example of pilot signal selecting data;

DESCRIPTION OF THE PREFERRED EMBODIMENTS

Figure 1:
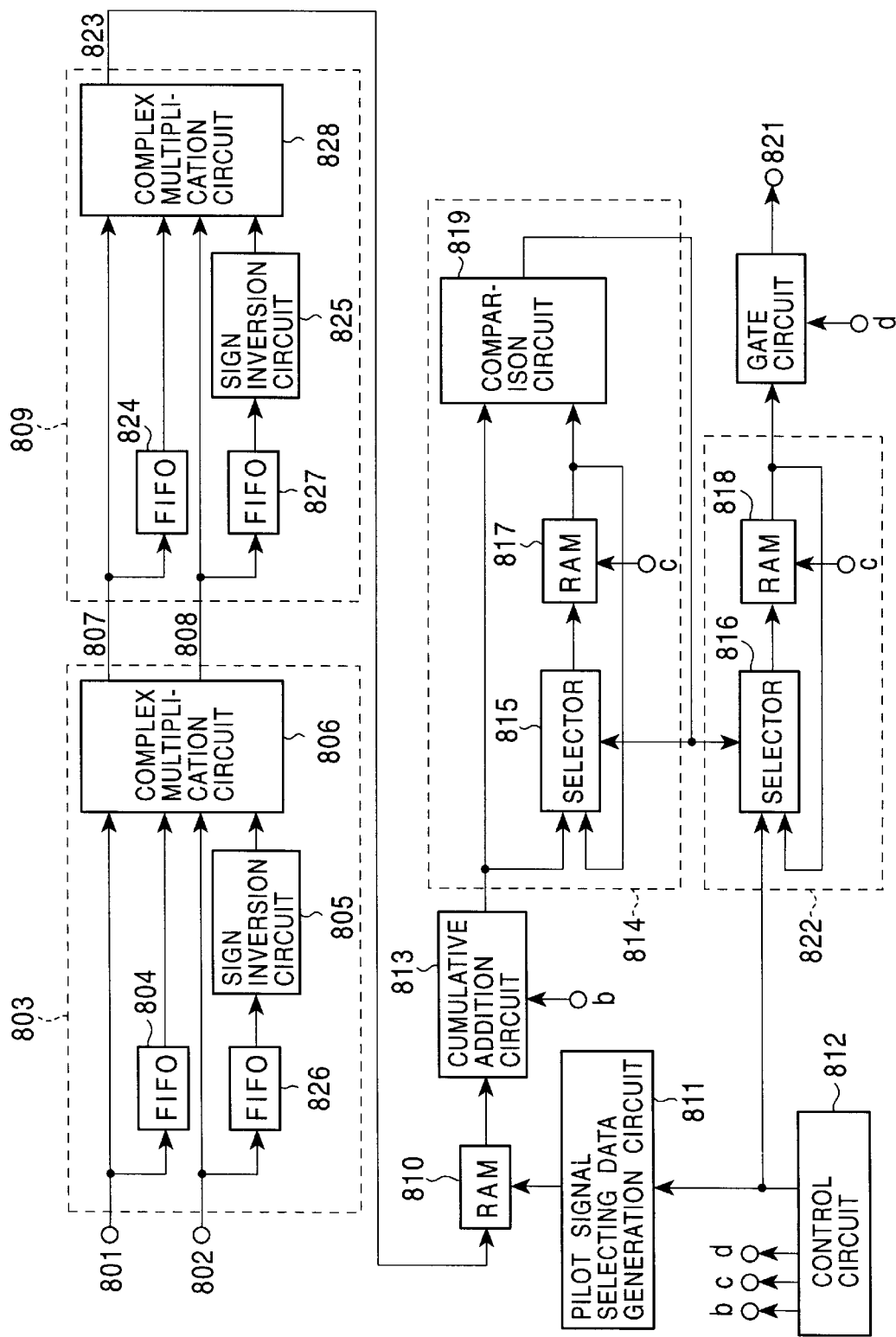
FIG. 1 is a block diagram showing the configuration of a first embodiment of the present invention.

FIG. 1 is a block diagram showing the configuration of a first embodiment of the present invention. This embodiment relates to the carrier frequency error calculation circuit 114 shown in FIG. 10.

Figure 10:
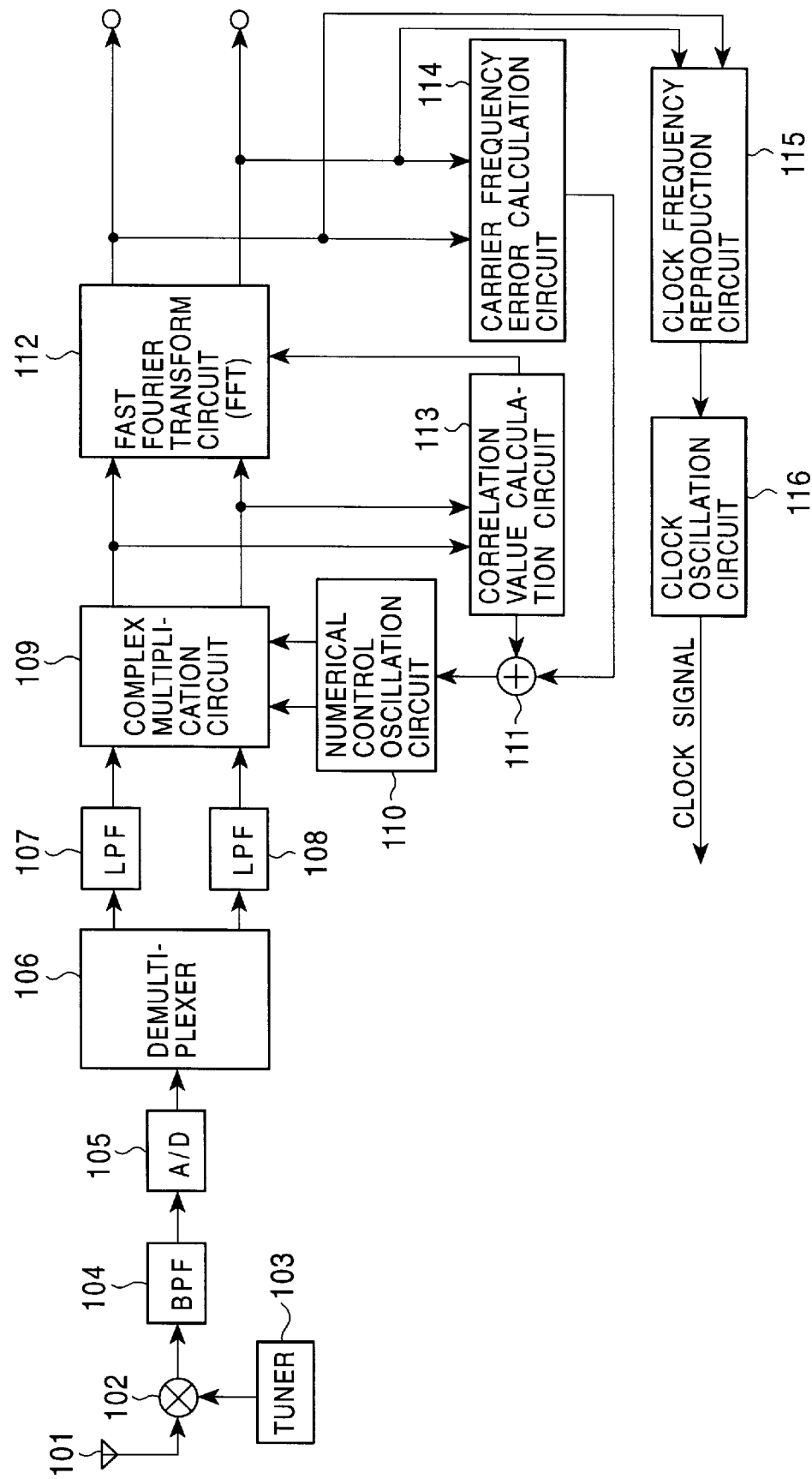
FIG. 10 is a block diagram showing the configuration of an OFDM receiver.
Figure 11:
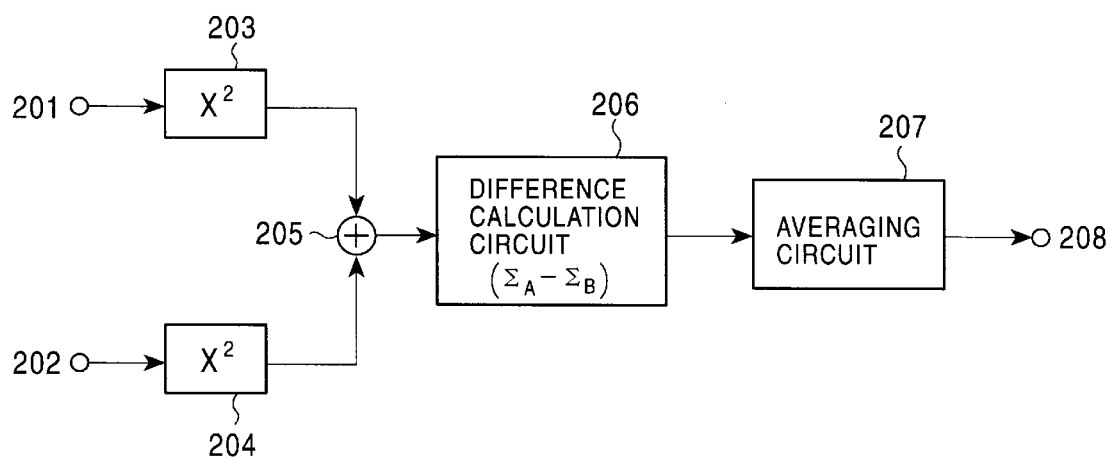
FIG. 11 is a block diagram showing the configuration of a conventional carrier frequency error calculation unit using frequency power.
Figure 12A:
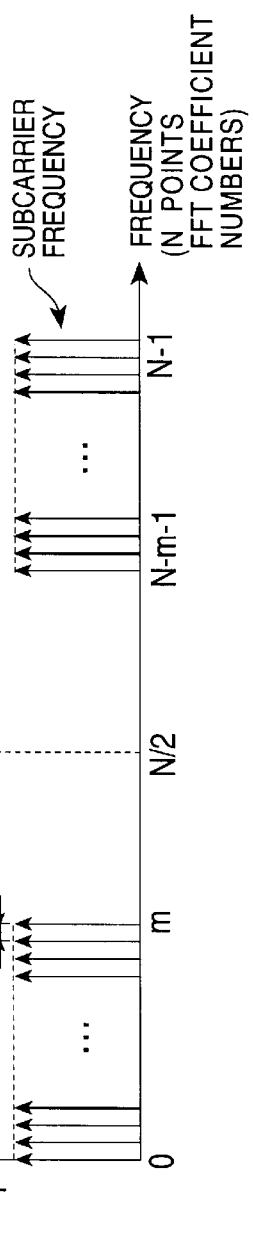
FIGS. 12A–12C is a diagram showing frequency patterns of an OFDM signal.
Figure 12B:
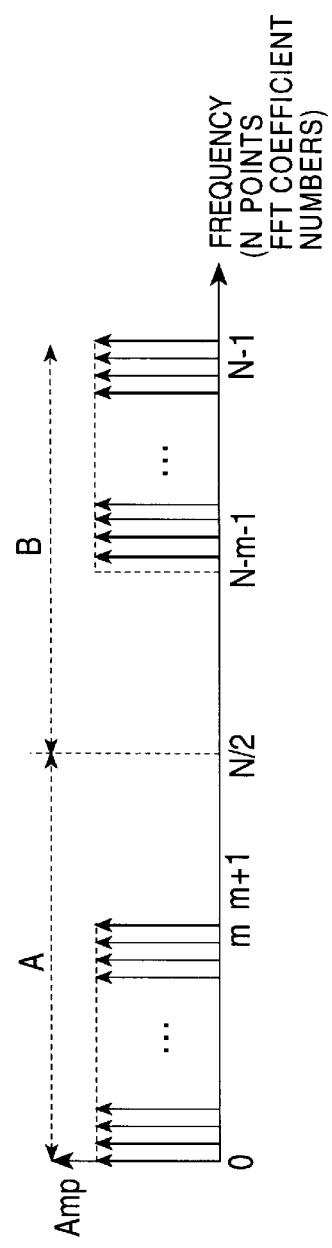
Figure 12C:
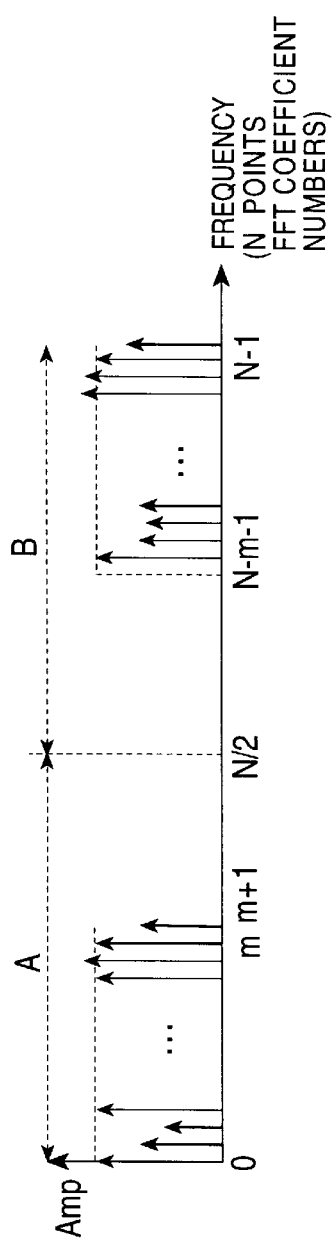

Referring to FIG. 1, a differential demodulation circuit 803 is formed of first-in/first-out memories (hereinafter referred to as FIFOs) 804 and 826, a sign inversion circuit 805, and a complex multiplication circuit 806, and is arranged to differential-demodulate I channel and Q channel data supplied from the fast Fourier transform circuit 112 shown in FIG. 10. That is, the differential demodulation circuit 803 is arranged to calculate and output a phase difference between delayed I and Q channel data and I and Q channel data newly input.

The FIFOs 804 and 826 are arranged to respectively output I channel data and Q channel data after delaying them by one symbol period. The sign inversion circuit 805 inverts the sign of output data from the FIFO 826 and outputs the sign-inverted data.

The complex multiplication circuit 806 is arranged to perform complex calculation represented by an expression below, wherein I and Q respectively represent undelayed I channel and Q channel data, and $I^{-1}$ and $Q^{-1}$ respectively represent delayed I channel and Q channel data, and to output the calculation result by separating it into a real component 807 and an imaginary component 808. The symbol j represents the pure imaginary number.

$$(I+jQ)(I^{-1}-jQ^{-1}) \qquad (1)$$

A differential demodulation circuit 809 is formed of FIFOs 824 and 827, a sign inversion circuit 825, and a complex multiplication circuit 828. The complex multiplication circuit 828 of the differential demodulation circuit 809 is arranged to output only the I-axis component (real component) of the complex calculation result as differential-demodulated data 823. In other respects, the configuration is the same as that of the differential demodulation circuit 803 and the same description will not be repeated.

A RAM 810 is arranged to store, in predetermined order, differential-demodulated data 823 corresponding to one symbol and output from the complex multiplication circuit 828. A pilot signal selecting data generation circuit 811 is arranged to form data for discriminating pilot signals from a plurality of subcarriers constituting one symbol (data formed of a set of ordinal numbers for pilot signals), and to shift this data according to control performed by a control circuit 812 (by uniformly adding a predetermined value to the data or subtracting a predetermined value from the data) to form and output a plurality of sets of pilot signal selecting data (as described below in detail).

The control circuit 812 is arranged to control the pilot signal selecting data generation circuit 811, a cumulative addition circuit 813, a maximum value detection circuit 814, a gate circuit 820, and a reproducing carrier frequency error storage circuit 822.

The cumulative addition circuit 813 is arranged to perform cumulative addition of signals output from the RAM 810 after being initialized by the control circuit 812 immediately before new data corresponding to one symbol is input.

The maximum value detection circuit 814 is formed of a selector 815, a RAM 817 and a comparison circuit 819 and is arranged to detect the largest of cumulative addition values of signals output from the cumulative addition circuit 813 and selected in accordance with pilot signal selecting data.

The selector 815 is arranged to select the greater one of a value stored in the RAM 817 (a maximum value previously selected and currently stored) and a cumulative addition value newly output from the cumulative addition circuit 813 according to control by the comparison circuit 819, and to supply the selected value to the RAM 817. The RAM 817 stores the maximum value currently selected and supplied from the selector 815. The comparison circuit 819 compares the output of the cumulative addition circuit 813 and the value stored in the RAM 817, and outputs a selecting signal to selectors 815 and 816.

The reproducing carrier frequency error storage circuit 822 is formed of the selector 816 and a RAM 818 and is arranged to store the amount of shift of pilot signal selecting data corresponding to the maximum value selected by the maximum value detection circuit 814.

That is, the selector 816 is arranged to select, according to the control signal from the comparison circuit 819, one of the amount of shift of pilot signal selecting data output from the control circuit 812 and the amount of shift of pilot signal selecting data corresponding to the maximum of the cumulative addition value currently stored in the RAM 818, and to supply the selected shift amount to the RAM 818. The RAM 818 stores the shift amount output from the selector 816.

The gate circuit 820 is arranged to output the amount of shift of a reproducing carrier frequency error, i.e., the amount of shift of pilot signal selecting data patterns, stored in the RAM 818 when the processing with respect to the entire pilot signal selecting data is completed.

The operation of the above-described embodiment will next be described with reference to FIGS. 2 to 5.

I channel data 801 and Q channel data 802 decomposed into subcarrier frequency components by the fast Fourier transform circuit 112 are input to the first-stage differential demodulation circuit 803.

In the first-stage differential demodulation circuit 803, the FIFO 804 and the FIFO 826 respectively output the I channel data and the Q channel data to the complex multiplication circuit 806 and to the sign inversion circuit 805 while delaying the data by one symbol period. The sign inversion circuit 805 inverts the sign of the data output from the FIFO 826 and outputs the sign-inverted data to the complex multiplication circuit 806.

The complex multiplication circuit 806 calculates the phase difference between the current data and the data one symbol before in accordance with equation (1) shown above.

In the second-stage differential demodulation circuit 809, the same processing as that in the differential demodulation circuit 803 is performed and only I-axis data in the obtained data is output.

Figure 2:
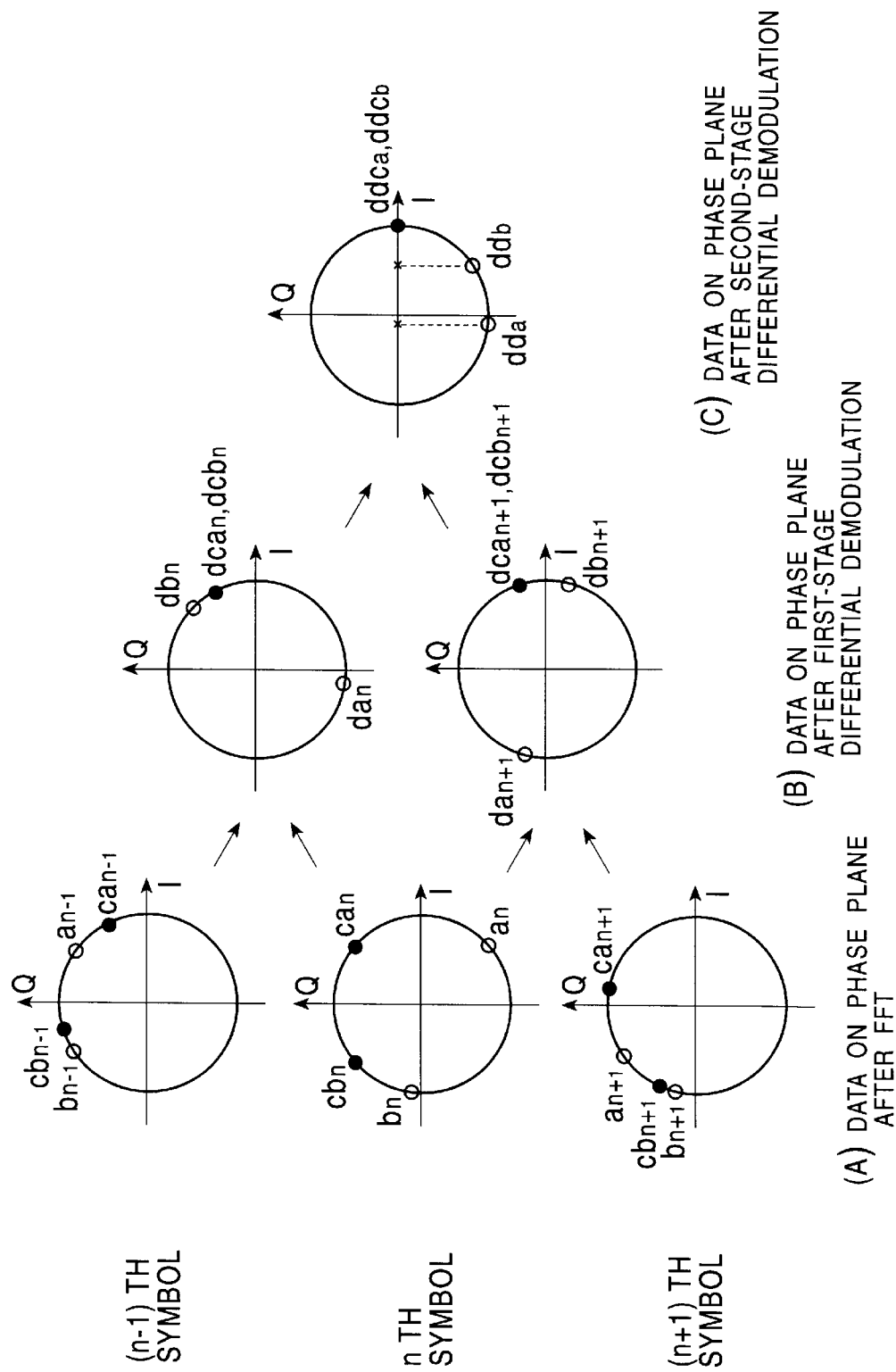
FIG. 2 is a diagram showing phase changes of information data and pilot signals after FFT and differential demodulation.

FIG. 2 is a diagram showing changes in the phases of information data and pilot signals in signals obtained as a result of differential demodulation processing performed by the first-stage and second-stage differential demodulation circuits 803 and 809 in the case where the information data is modulated by quadrature phase shift Keying (QPSK), and where a particular one of four signal points of QPSK modulation as a pilot signal.

In (2) of FIG. 2(A), I channel data 801 and Q channel data 802 decomposed into subcarrier frequency components by fast Fourier transform (hereinafter referred to as FFT) are shown on a phase plane with respect to symbols; $a_n$ and $b_n$ respectively represent information data items of subcarrier frequencies a and b in the nth OFDM symbol after FFT; and $ca_n$ and $cb_n$ respectively represent pilot signals of subcarrier frequencies ca and cb in the nth OFDM symbol after FFT. It is possible that pilot signals, originally having constant amplitude and phase information, are phase-rotated to some extent in each symbol by the influence of a reproducing carrier frequency error or the like.

In (B) of FIG. 2, outputs 807 and 808 of the first-stage differential demodulation circuit 803 are shown on a phase plane with respect to symbols; $da_n$ and $db_n$ respectively represent signals of subcarrier frequencies a and b differential-demodulated from the (n−1)th symbol and the nth symbol; and $dca_n$ and $dcb_n$ respectively represent signals of subcarrier frequencies ca and cb differential-demodulated from the (n−1)th symbol and the nth symbol.

In (C) of FIG. 2, an output of the second-stage differential demodulation circuit 809, and dda and ddb respectively represent the results of further differential demodulation of the signals of subcarrier frequencies a and b differential-demodulated from the (n−1)th symbol and the nth symbol and the signals of subcarrier frequencies a and b differential-demodulated from the nth symbol and the (n+1)th symbol. Also, ddca and ddcb respectively represent the results of further differential demodulation of the signals of subcarrier frequencies ca and cb differential-demodulated from the (n−1)th symbol and the nth symbol and the signals of subcarrier frequencies ca and cb differential-demodulated from the nth symbol and the (n+1)th symbol.

Since pilot signals ca and cb are constant-phase signals, an FFT window phase error and a reproducing carrier phase error are removed by the first-stage differential demodulation while a reproducing carrier frequency error and a phase error depending on a reproducing clock frequency error remain. Each of the phase errors remaining after first-stage differential demodulation is independent of time and is, therefore, constant between the data items after differential demodulation. Then, the phase errors remaining after the first-stage differential demodulation can be removed by performing the second-stage differential demodulation between the data items processed by the first-stage differential demodulation. As a result, the pilot signals converge at a certain positive value on the I-axis (see (C) of FIG. 2).

On the other hand, since information data a and b have random phases between symbols, the phases after differential demodulation are also random with respect to data items, so that I-axis data also scatters randomly on the I-axis. Therefore, the result of cumulative addition of I-axis data obtained by extracting only pilot signals has a value much larger than that of the result of cumulative addition of I-axis data obtained by extracting only information data. It is, therefore, possible to estimate a reproduced frequency error by identifying the pilot signal selecting data with which the maximum value of the cumulative addition is obtained.

Figure 3:
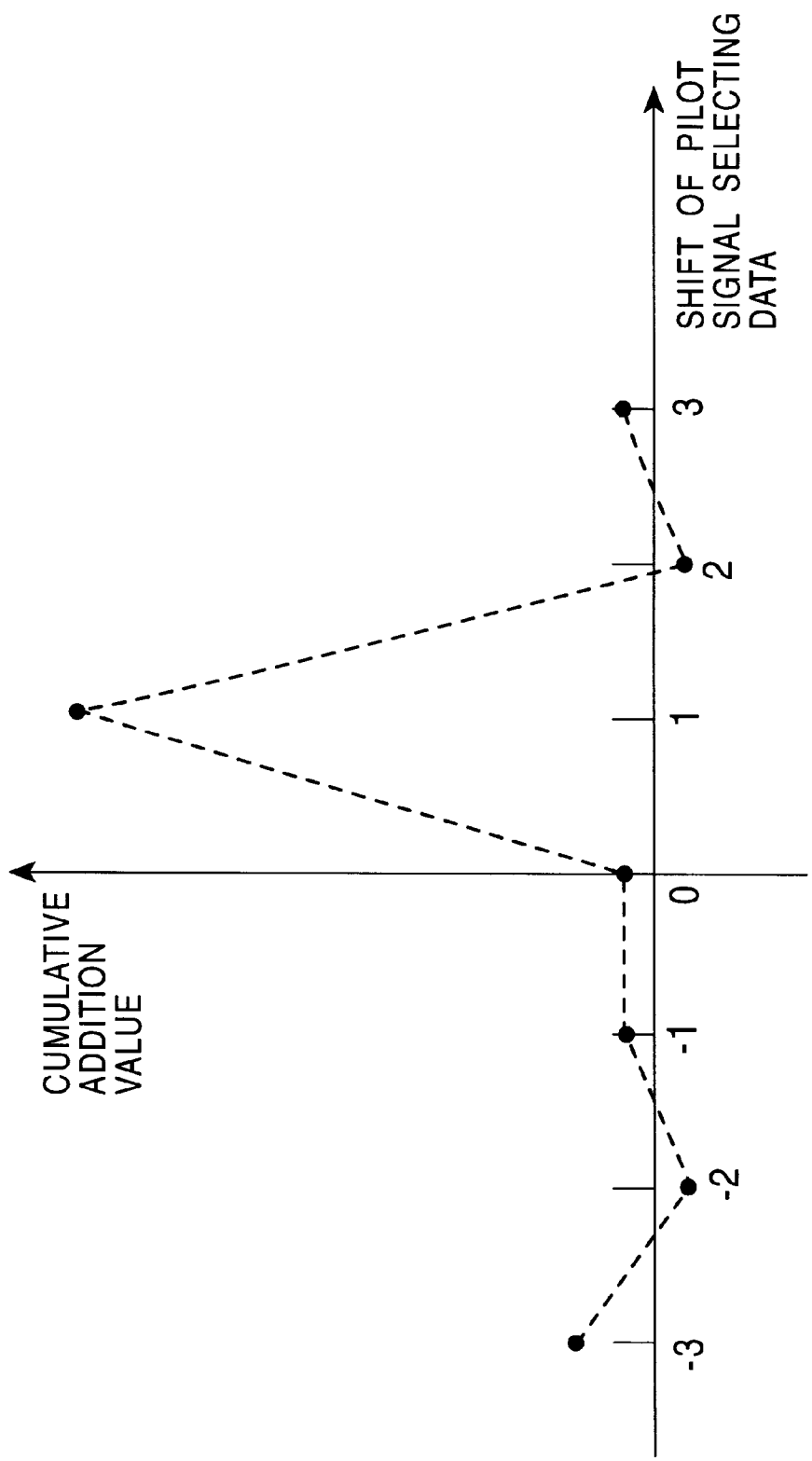
FIG. 3 is a diagram showing the relationship between a cumulative addition value and the amount of shift of pilot signal selecting data.

FIG. 3 shows the relationship between the amount of shift of pilot signal selecting data and the cumulative addition value when reproduced frequencies have an incremental error corresponding to the subcarrier frequency interval. It can be understood from this example that the cumulative addition value is maximized when the pilot signals are shifted by the subcarrier frequency interval in the increasing direction, as shown in FIG. 3.

Referring back to FIG. 1, differential-demodulated data 823 is stored in the RAM 810 in the order of being output. When differential-demodulated data 823 corresponding to one symbol is stored in the RAM 810, reproducing carrier frequency error estimate processing described below is executed.

When reproducing carrier frequency error estimate processing is executed, the RAM 817 for storing cumulative addition data is first initialized to have 0 written therein by a signal c output from the control circuit 812. Simultaneously, the RAM 818 of the reproducing carrier frequency error storage circuit 822 for storing the frequency error amount is also initialized to have 0 written therein by control signal c from the control circuit 812. Initialization of RAMs 817 and 818 is repeatedly executed immediately before starts of reproducing carrier frequency error estimate processing with respect to each symbol.

The control circuit 812 then starts generation of pilot signal selecting data by controlling the pilot signal selecting data generation circuit 811. The operation of the pilot signal selecting data generation circuit 811 will now be described in detail.

FIG. 4A shows a transmitted original OFDM frequency signal, and FIG. 4B shows OFDM frequency signals reproduced with a reproducing carrier frequency having an error corresponding to the subcarrier frequency interval and corresponding FFT coefficient numbers. The frequency signals indicated by the thick lines are pilot signals prescribed on the transmitting side. In FIG. 4A, FFT coefficient numbers 21, 36, 852, . . . , 2000 correspond to pilot signals.

If the reproducing carriers contain no frequency error, signals corresponding to those shown in FIG. 4A are stored in the RAM 810. In that case, the output of the cumulative addition circuit 813 is maximized when the pilot signal selecting data generation circuit 811 outputs information for selecting the 21st, 36th, . . . , 2000th as pilot signal selecting data (a set of pilot signal ordinal numbers) for the above-described reason.

In the case where, as shown in FIG. 4B, the reproducing carrier frequencies are higher by one subcarrier frequency interval (having an error), the pilot signals are placed corresponding to the 22nd, 37th, . . . , 20001st. In this situation, the output of the cumulative addition circuit 813 is maximized when the pilot signal selecting data generation circuit 811 outputs pilot signal selecting data obtained by shifting all the information items by one carrier frequency interval in the increasing direction.

Accordingly, it is desirable to prepare, as pilot signal selecting data, a plurality of sets of data in such a manner that the pattern prescribed on the transmitting side (FIG. 4A) is shifted by steps corresponding to the carrier frequency intervals to each of a higher frequency point and a lower frequency point on the frequency axis.

FIG. 5 shows an example of such pilot signal selecting data. In this example, FIG. 5C coincides with the pattern prescribed on the transmitting side. FIGS. 5B and 5A show patterns each formed by shifting the prescribed pattern to a lower frequency point on the frequency axis by one or two carrier frequency interval steps. FIGS. 5D and 5E show patterns each formed by shifting the prescribed pattern to a lower frequency point on the frequency axis by one or two carrier frequency interval steps.

The pilot signal selecting data generation circuit 811 generates, under the control of the control circuit 812, information such as shown in FIG. 5A as first pilot signal selecting data and outputs the information to the RAM 810. In synchronization with the progress of processing, the pilot signal selecting data generation circuit 811 successively generates information such as shown in FIGS. 5B, 5C, . . . , 5E and outputs the information to the RAM 810.

The RAM 810 successively reads out data stored with addresses designated by data (pilot signal selecting data) output from the pilot signal selecting data generation circuit 811, and supplies the read data to the cumulative addition circuit 813.

The value of the cumulative addition circuit 813 is initialized to zero by signal b from the control circuit 812 immediately before a new pilot signal is supplied. When the cumulative addition circuit 813 is initialized, data is read out from the RAM 810 in accordance with the pilot signal selecting data output from the pilot signal selecting data generation section 811 to be accumulated by cumulative addition.

The result of calculation by the cumulative addition circuit 813 is supplied to the comparison circuit 819 and the selector 815 of the maximum detection circuit 814. Simultaneously, the value stored in the RAM 817 is supplied to the selector 815. The comparison circuit 819 compares the cumulative addition value obtained by using the pilot signal selecting data currently output and the maximum of cumulative addition values previously obtained and stored in the RAM 817, and outputs a control signal to the selector 815 to select the greater one of them. The value selected by the selector 815 is supplied to the RAM 817 to be used for the next comparison.

The selector 816 of the reproducing carrier frequency error storage circuit 822 selects, according to the output from the comparison circuit 819, one of the amount of shift of pilot signal selecting data at the corresponding time, supplied from the control circuit 812, and the amount of shift corresponding to the maximum value previously obtained and stored in the RAM 818, and outputs the selected shift amount to the RAM 818. That is, if the data output from the cumulative addition circuit 813 is larger than the maximum value previously obtained and stored in the RAM 817, the selector 816 selects the current shift amount output from the control circuit 812 and supplies the selected shift amount to the RAM 818 or, if the data stored in the RAM 817 is greater, the selector 816 makes the RAM 818 again store the data stored in the RAM 818.

When the RAM 817 or 818 of the maximum value detection circuit 814 or the reproducing carrier frequency error storage circuit 822 is updated, the control circuit 812 controls the pilot signal selecting data generation circuit 811 so as to make the same successively output the next pilot signal selecting data to repeat the above-described sequence of steps of the correlation value maximum detection operation.

When the processing of the final pilot signal selecting data is completed, the control circuit 812 controls the gate circuit 820 by signal d to output the amount of shift of pilot signal selecting data corresponding to the reproducing carrier frequency error, i.e., the maximum value, stored in the RAM 818. Reproducing carrier frequency error 821 is supplied to the addition circuit 111 shown in FIG. 10 to be supplied to the numerical control oscillation circuit 110 together with the correlation value. Consequently, the frequency of oscillation of the numerical control oscillation circuit 110 is accurately controlled.

In this embodiment, two-stage differential demodulation of I channel data and Q channel data is performed and an error in reproducing carrier frequencies is thereafter detected and corrected by using a plurality of shifted sets of pilot signal selecting data, thus enabling suitable correction of reproducing carrier frequencies even if the reproducing carrier frequencies have an error larger than the subcarrier frequency interval. Moreover, even if the transmission channel has a multipath interference or the like, correct reproducing carrier frequencies can be reproduced since the electric power of the carriers is not referred to.

While the embodiment using patterns for a reproducing carrier frequency error corresponding to ±2 subcarrier frequency interval steps as shown in FIG. 5 has been described, pilot signal selecting data for other reproducing carrier frequency errors may alternatively be generated.

Figure 6:
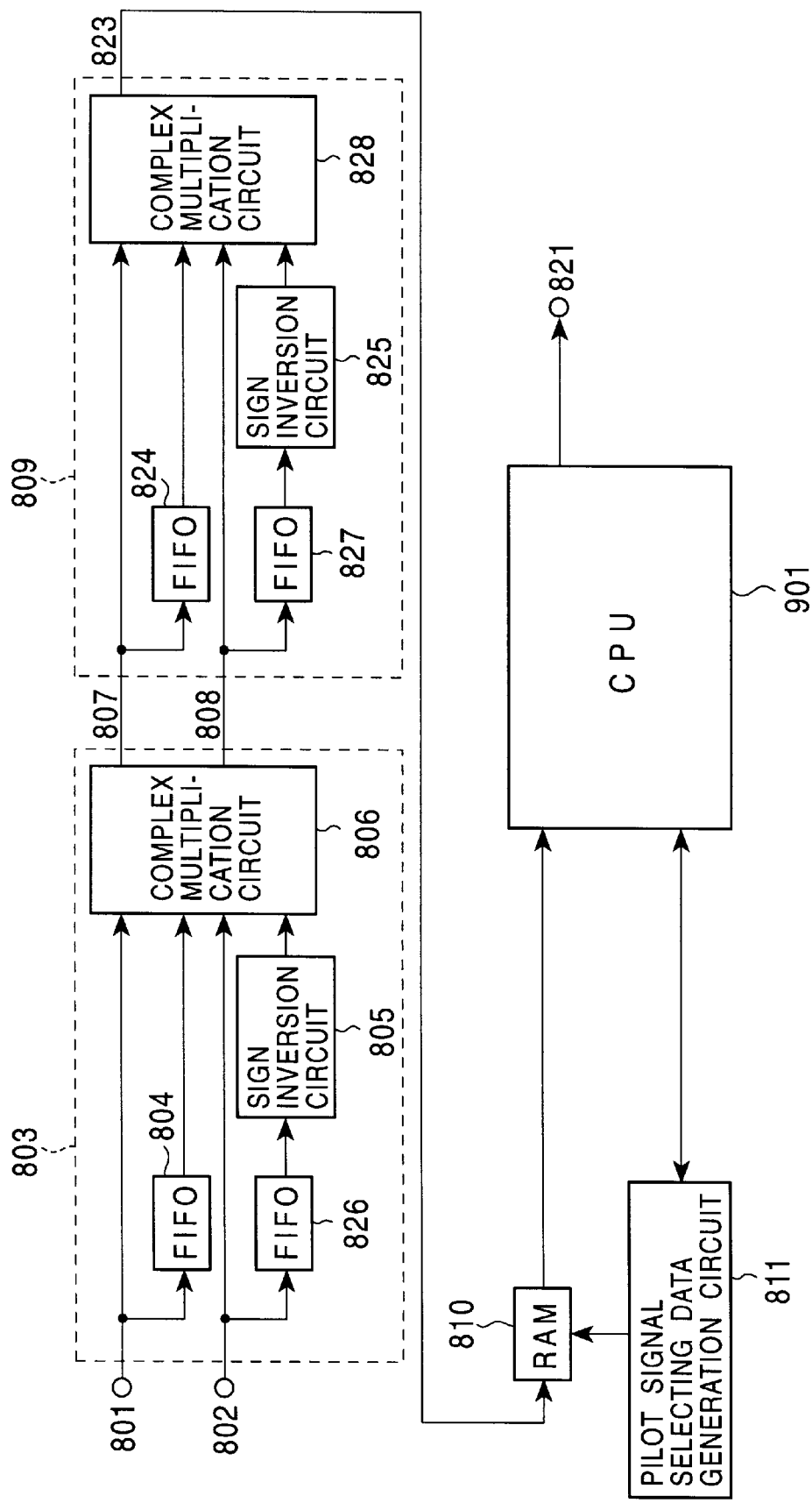
FIG. 6 is a diagram showing the configuration of a second embodiment of the present invention.

FIG. 6 shows a second embodiment of the present invention. In FIG. 6, sections corresponding to those shown in FIG. 1 are indicated by the corresponding reference numerals. The description for the corresponding sections will not be repeated.

The embodiment shown in FIG. 6 has a CPU 901 provided in place of the control circuit 812, the cumulative addition circuit 813, the maximum value detection circuit 814, the gate circuit 820 and the reproducing carrier frequency error storage circuit 822. In other respects, the configuration of this embodiment is the same as that shown in FIG. 1.

The CPU 901 is arranged to execute, based on a program or the like stored in an unillustrated storage device, the same processing as that executed by the control circuit 812, the cumulative addition circuit 813, the maximum value detection circuit 814, the gate circuit 820 and the reproducing carrier frequency error storage circuit 822 in the embodiment shown in FIG. 1.

The operation of this embodiment is the same as that of the embodiment shown in FIG. 1 and the description for it will not be repeated.

Figure 7:
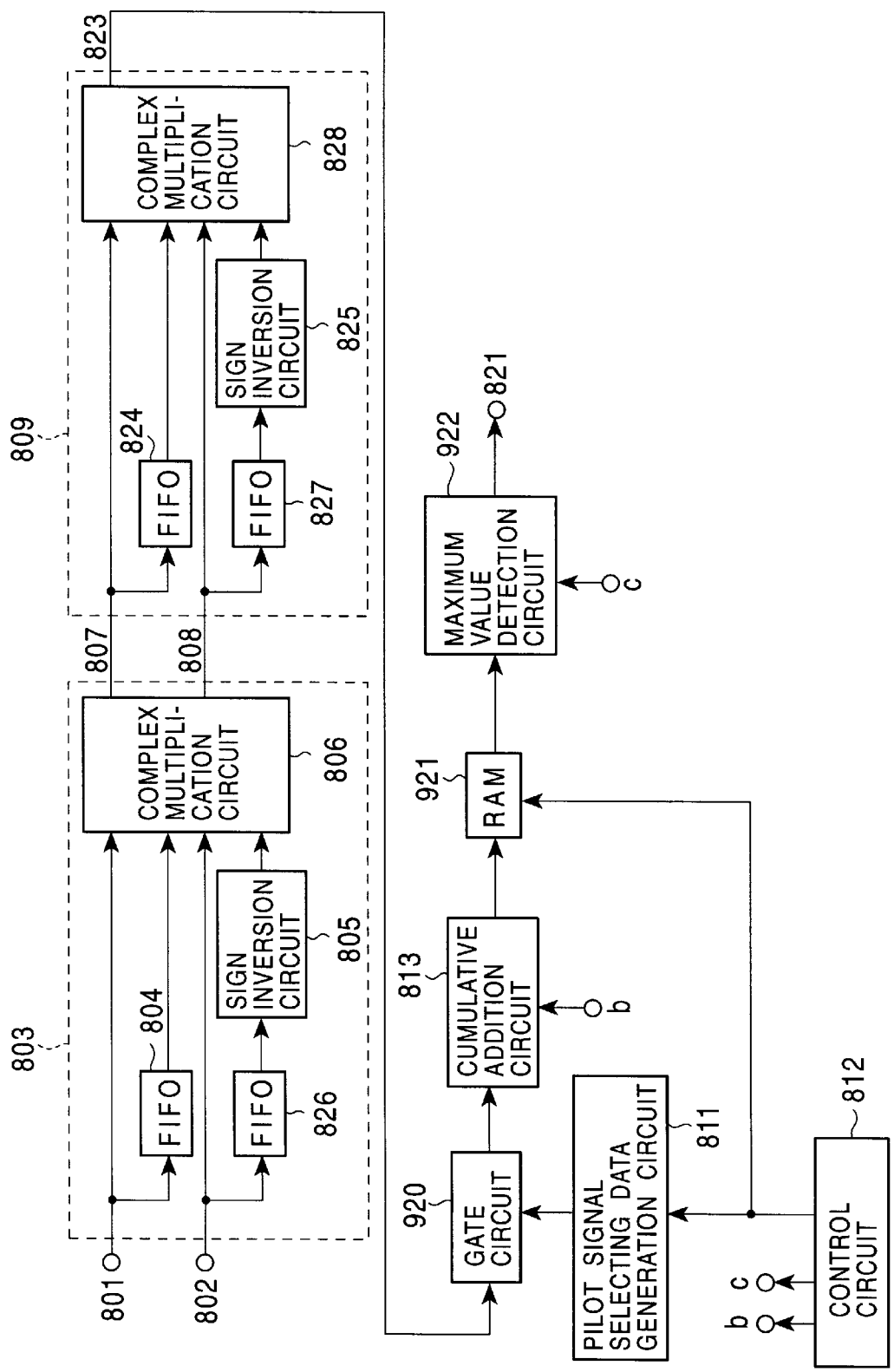
FIG. 7 is a diagram showing the configuration of a third embodiment of the present invention.

FIG. 7 shows the configuration of a third embodiment of the present invention. Sections of this embodiment corresponding to those shown in FIG. 1 are indicated by the corresponding reference numerals, and the description for them will not be repeated.

The embodiment shown in FIG. 7 has, in comparison with the embodiment shown in FIG. 1, a gate circuit 920 substituted for the RAM 810, and has a RAM 921 and a maximum value detection means 922 newly added while the maximum value detection circuit 814, the gate circuit 820, and the reproducing carrier frequency error storage circuit 822 are removed.

The gate circuit 920 is arranged to extract, from differential-demodulated data output from the differential demodulation circuit 809, particular components designated by data which is output from the pilot signal selecting data generation section 811, and to output the extracted data to the cumulative addition circuit 813.

The RAM 921 is arranged to store an output value of the cumulative addition circuit 813 and the shift amount (the amount of shift of pilot signal selecting data) supplied from the control circuit 812 and corresponding to the cumulative addition value.

The maximum value detection circuit 922 searches out the largest of cumulative addition values stored in the RAM 921, and outputs the shift amount corresponding to the obtained largest value as reproducing carrier frequency error 821.

The operation of this embodiment will next be described briefly.

The gate circuit 920 selects particular components of differential-demodulated data output from the differential demodulation circuit 809 in accordance with data successively output from the pilot signal selecting data generation section 811.

The cumulative addition circuit 813 calculates the sum of the entire data output from the gate circuit 920 (data selected in accordance with pilot signal selecting data shifted by a predetermined amount), and outputs the result of this addition.

The RAM 921 stores output values of the cumulative addition circuit 813 corresponding to one symbol (cumulative addition values corresponding to the entire pilot signal selecting data) together with the data output from the control circuit 812 (amounts of shift of pilot signal selecting data).

The maximum value detection circuit 922 searches out the largest of the cumulative addition values stored in the RAM 921 and corresponding to one symbol, reads out the shift =amount stored with the obtained largest value, and outputs the shift amount as reproducing carrier frequency error 821.

The subsequent processing is the same as that of the embodiment shown in FIG. 1.

Figure 8:
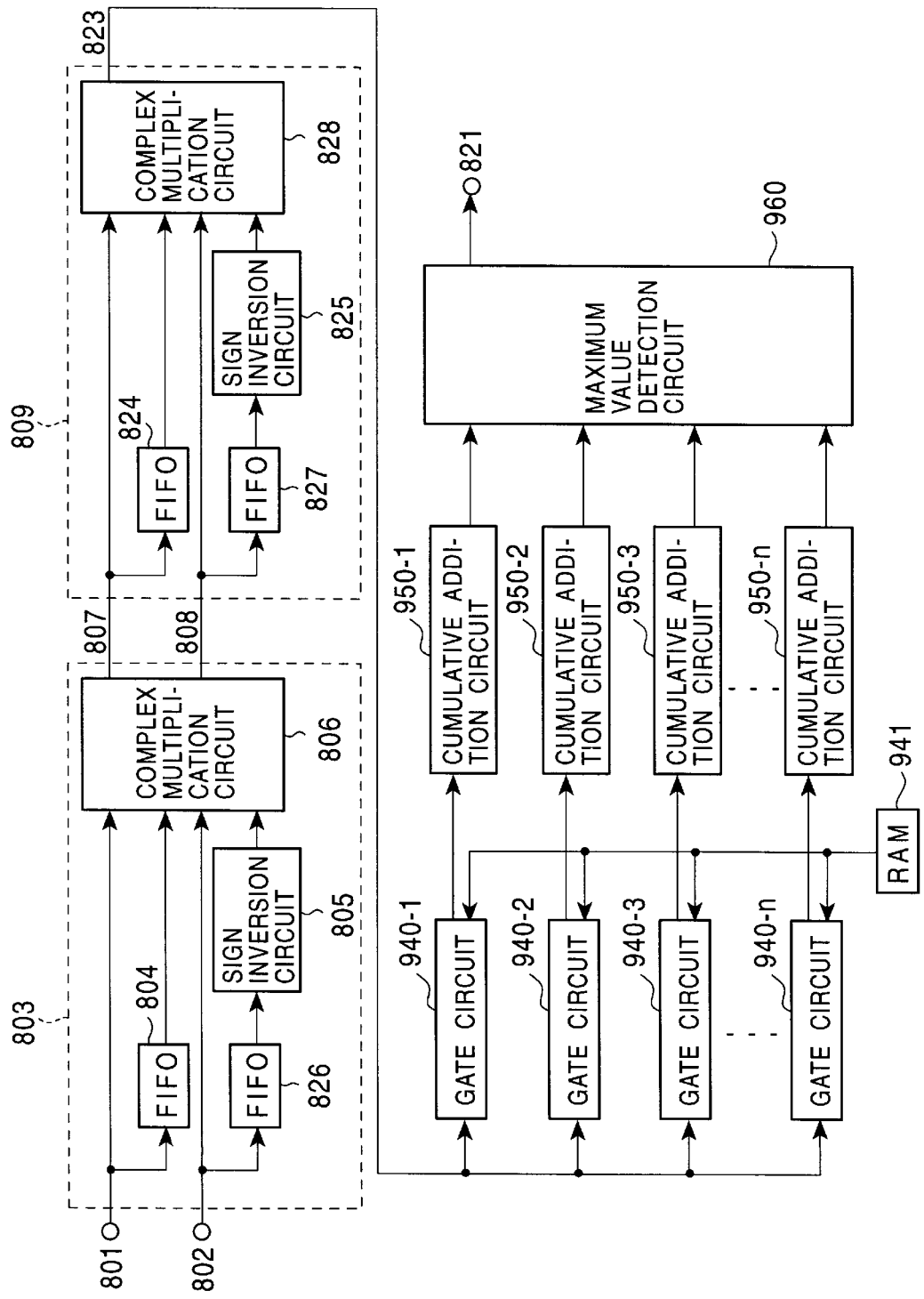
FIG. 8 is a block diagram showing the configuration of a fourth embodiment of the present invention.

FIG. 8 shows the configuration of a fourth embodiment of the present invention. Sections of this embodiment corresponding to those shown in FIG. 1 are indicated by the corresponding reference numerals, and the description for them will not be repeated.

The embodiment shown in FIG. 8 is arranged in such a manner that the RAM 810, the pilot signal selecting data generation circuit 811, the control circuit 812, the cumulative addition circuit 813, the maximum value detection circuit 814, the gate circuit 820, and the reproducing carrier frequency error storage circuit 822 are removed from the embodiment shown in FIG. 1, and, in place of these components, gate circuits 940-1 to 940-n, a RAM 941, cumulative addition circuits 950-1 to 950-n, and a maximum value detection circuit 960 are added.

The RAM 941 has n sets of pilot signal selecting data (see FIG. 5) stored therein, which correspond to a frequency error range to be searched. The RAM 941 supplies each data set to the corresponding one of the gate circuits 940-1 to 940-n.

The gate circuits 940-1 to 940-n are arranged to select and output components of differential-demodulated data output from the differential demodulation circuit 809 in accordance with the pilot signal selecting data supplied from the RAM 941.

The cumulative addition circuits 950-1 to 950-n are arranged to perform cumulative addition of data respectively output from the gate circuits 940-1 to 940-n, and to output the addition results.

The maximum value detection circuit 960 is arranged to detect the largest of the outputs from the cumulative addition circuits 950-1 to 950-n, and to output the shift amount (the amount of shift of pilot signal selecting data) corresponding to the largest value as reproducing carrier frequency error 821.

The operation of this embodiment will next be described briefly.

Differential-demodulated data output from the differential demodulation circuit 809 is supplied to the gate circuits 940-1 to 940-n. Since n sets of pilot signal selecting data stored in the RAM 941 have previously been supplied to the gate circuits 940-1 to 940-n, each gate circuit selects differential-demodulated data in accordance with the pilot signal selecting data and outputs the selected data to the corresponding one of the cumulative addition circuits 950-1 to 950-n.

The cumulative addition circuits 950-1 to 950-n respectively perform cumulative addition of the particular components of differential-demodulated data selected by the gate circuits 940-1 to 940-n and output the addition results.

The maximum value detection circuit 960 detects the largest of the outputs of the cumulative addition circuits 950-1 to 950-n and outputs the shift amount corresponding to the largest value as reproducing carrier frequency error 821.

The subsequent processing is the same as that of the embodiment shown in FIG. 1.

Figure 9:
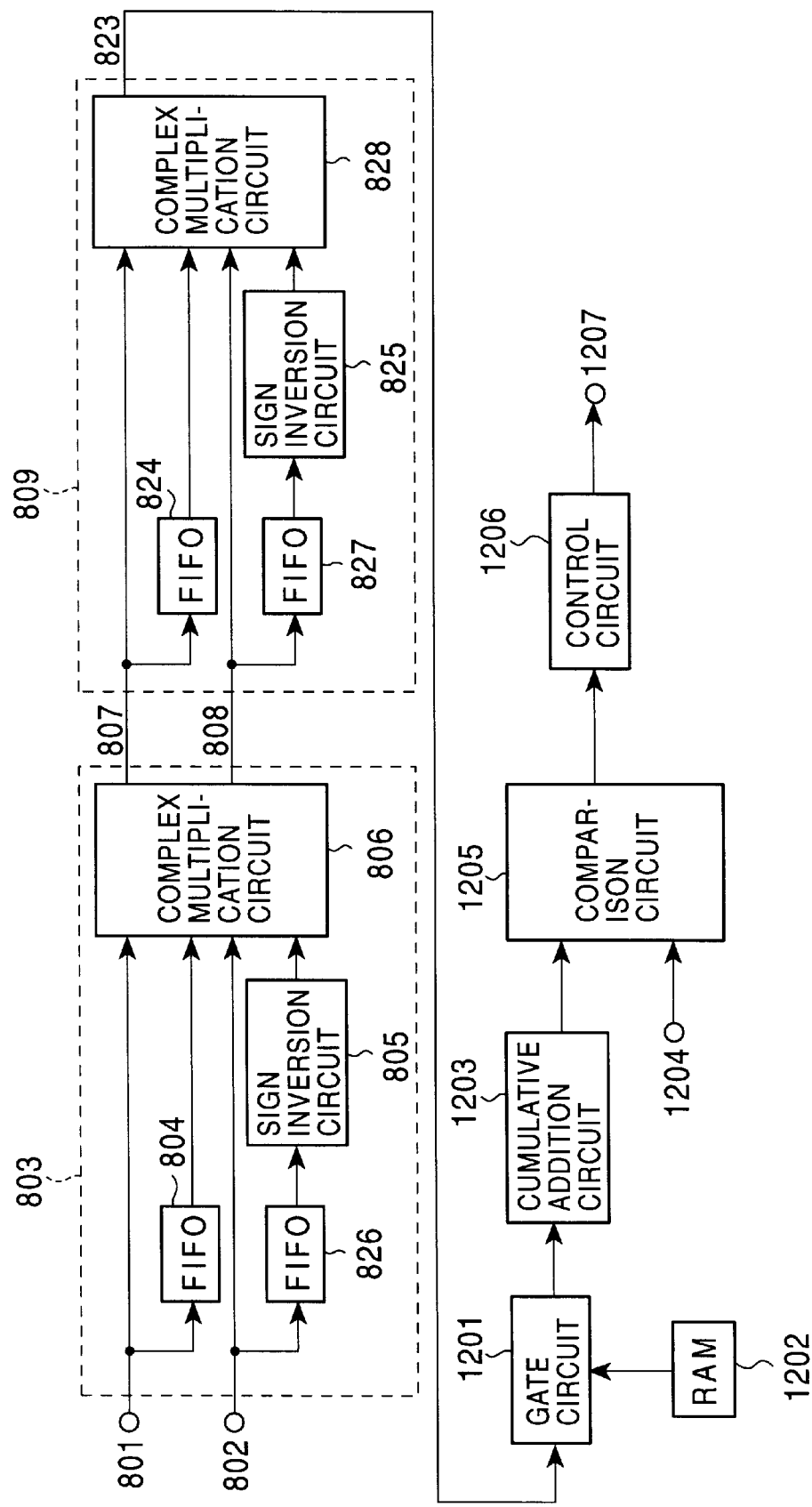
FIG. 9 is a block diagram showing the configuration of a fifth embodiment of the present invention.

FIG. 9 shows the configuration of a fifth embodiment of the present invention. Sections of this embodiment corresponding to those shown in FIG. 1 are indicated by the corresponding reference numerals, and the description for them will not be repeated.

The embodiment shown in FIG. 9 is arranged in such a manner that the RAM 810, the pilot signal selecting data generation circuit 811, the control circuit 812, the cumulative addition circuit 813, the maximum value detection circuit 814, the gate circuit 820, and the reproducing carrier frequency error storage circuit 822 are removed from the embodiment shown in FIG. 1, and, in place of these components, a gate circuit 1201, a RAM 1202, a cumulative addition circuit 1203, a comparison circuit 1205 and a control circuit 1206 are added.

Referring to this diagram, the gate circuit 1201 is arranged to select a particular component from differential-demodulated data output from the differential demodulation circuit 809 in accordance with pilot signal selecting data stored in the RAM 1202, and to output the selected component to the cumulative addition circuit 1203.

The RAM 1202 has pilot signal selecting data stored therein, read outs the stored data and outputs the read data to the gate circuit 1201. This data is prescribed on the transmitting side and designates ordinal numbers for pilot signals. This data corresponds to that shown in FIG. 5C (corresponding to the case where fe=0).

The cumulative addition circuit 1203 is arranged to perform cumulative addition of particular components of differential-demodulated data selected by the gate circuit 1201, and to output the addition result to the comparison circuit 1205.

The comparison circuit 1205 compares the output of the cumulative addition circuit 1203 and a reference value 1204, and outputs the comparison result to the control circuit 1206.

The control circuit 1206 is arranged to shift the frequency of oscillation of the numerical control oscillation circuit 110 step by step by an unit amount corresponding to one subcarrier frequency interval according to the result of comparison performed by the comparison circuit 1205.

The operation of this embodiment will next be described briefly.

Differential-demodulated data output from the differential demodulation circuit 809 is supplied to the gate circuit 1201. The gate circuit 1201 extracts a particular component from the differential-demodulated data in accordance with pilot signal selecting data stored in the RAM 1202, and outputs the selected component to the cumulative addition circuit 1203.

The cumulative addition circuit 1203 outputs to the comparison circuit 1205 the result of cumulative addition of particular components of differential-demodulated data extracted by the gate circuit 1201. The comparison circuit 1205 compares the output value of the cumulative addition circuit 1203 and the reference value 1204, and outputs a predetermined control signal to the control circuit 1206 if the output of the cumulative addition circuit 1203 becomes larger than the predetermined reference value 1204.

The control circuit 1206 successively shifts the frequency of oscillation of the numerical control oscillation circuit 110 by the subcarrier frequency interval, for example, from a lower frequency to a higher frequency until the output of the cumulative addition circuit 1203 becomes larger than the reference value 1204. When the output of the cumulative addition circuit 1203 becomes larger than the reference value 1204, the control circuit 1206 recognizes the corresponding frequency as the correct reproduced frequency, and fixes the frequency of oscillation of the numerical control circuit 110 at the recognized frequency.

In the above-described embodiments, a correct carrier frequency can be reproduced even if the transmission channel has multipath interference or the like. Also, even if an OFDM signal has an error larger than the subcarrier frequency interval, reproducing carrier waves can be reproduced reliably.

In the receiving apparatus according to the first aspect of the present invention and the receiving method according to the second aspect of the present invention, an OFDM signal is processed by discrete Fourier transform; data thereby obtained is stored: a phase difference between the stored data at least one symbol before and data newly obtained by discrete Fourier transform is computed; phase difference data thereby obtained is stored; a phase difference between the stored phase difference data at least one symbol before and phase difference data newly computed is further computed; an I-axis component of phase difference data obtained is extracted; an error in pilot signals contained in the extracted I-axis component from the original frequencies is estimated; and the frequencies of reproducing carriers are adjusted according to the estimated error in the pilot signals from the original frequencies. Therefore, it is possible to accurately reproduce reproducing frequencies even if the transmission channel has multipath interference or the like.

In the receiving apparatus according to the third aspect of the present invention and the receiving method according to the fourth aspect of the present invention, an OFDM signal is processed by discrete Fourier transform; data thereby obtained is stored; a phase difference between the stored data at least one symbol before and data newly obtained by discrete Fourier transform is computed; phase difference data thereby obtained is stored; a phase difference between the stored phase difference data at least one symbol before and phase difference data newly computed is further computed; an I-axis component of phase difference data obtained is extracted; phase difference data supposed to be pilot signals is extracted from the phase difference data of the extracted I-axis component; the extracted phase difference data supposed to be pilot signals is accumulated by cumulative addition; and the frequencies of carriers are controlled so that the calculation result is equal to or larger than a predetermined value. Therefore, it is possible to accurately reproduce reproducing carriers even if the OFDM signal has an FFT window phase error, a reproducing carrier phase error, a reproducing carrier frequency error and a reproducing clock frequency error.

What is claimed is:

1. An apparatus for receiving an OFDM signal, comprising:

conversion means for performing discrete Fourier transform of the OFDM signal;

first storage means for storing data obtained by said conversion means;

first computation means for computing a phase difference between data at least one symbol before stored in said first storage means and data newly obtained by said conversion means;

second storage means for storing phase difference data obtained by said first computation means;

second computation means for further computing a phase difference between the phase difference data at least one symbol before stored in said second storage means and phase difference data newly computed by said first computation means;

extraction means for extracting an I-axis component of phase difference data output from said second computation means;

estimation means for estimating an error in pilot signals contained in the I-axis component extracted by said extraction means from the original frequencies; and adjustment means for adjusting the frequencies of reproducing carriers according to the error in the pilot signals from the original frequencies estimated by said estimation means.

2. An apparatus according to claim 1, further comprising:

third storage means storing a placement pattern of the pilot signals placed on the frequency axis on the transmitting side;

second extraction means for extracting, according to the placement pattern stored in said third storage means, particular data from the I-axis component data extracted by said extraction means; and addition means for performing cumulative addition of the data extracted by said second extraction means, wherein said estimation means estimates an error in the pilot signals from the original frequencies according to a calculation result obtained by said addition means.

3. An apparatus according to claim 2, further comprising change means for changing points at which said second extraction means extracts data according to said placement pattern, wherein, when points at which said second extraction means extracts data are changed by said changing means, said estimation means estimates an error in the frequencies by referring to the points at which the calculation result obtained by said addition means is maximized.

4. A method of receiving an OFDM signal, comprising:

a conversion step of performing discrete Fourier transform of the OFDM signal;

a first storage step of storing data obtained in said conversion step;

a first computation step of computing a phase difference between data at least one symbol before stored in said first storage step and data newly obtained in said conversion step;

a second storage step of storing phase difference data obtained in said first computation step;

a second computation step of further computing a phase difference between the phase difference data at least one symbol before stored in said second storage step and phase difference data newly computed in said first computation step;

an extraction step of extracting an I-axis component of phase difference data output in said second computation step;

an estimation step of estimating an error in pilot signals contained in the I-axis component extracted in said extraction step from the original frequencies; and an adjustment step of adjusting the frequencies of reproducing carriers according to the error in the pilot signals from the original frequencies estimated in said estimation step.

5. An apparatus for receiving an OFDM signal, comprising:

conversion means for performing discrete Fourier transform of the OFDM signal;

first storage means for storing data obtained by said conversion means;

first computation means for computing a phase difference between data at least one symbol before stored in said first storage means and data newly obtained by said conversion means;

second storage means for storing phase difference data obtained by said first computation means;

second computation means for further computing a phase difference between the phase difference data at least one symbol before stored in said second storage means and phase difference data newly computed by said first computation means;

extraction means for extracting an I-axis component of phase difference data output from said second computation means;

second extraction means for extracting phase difference data supposed to be pilot signals from the I-axis component extracted by said extraction means;

addition means for performing cumulative addition of the phase difference data extracted by said second extraction means; and control means for controlling the frequencies of carriers so that a calculation result obtained by said addition means is equal to or larger than a predetermined value.

6. A receiving method of receiving an OFDM signal, comprising:

a conversion step of performing discrete Fourier transform of the OFDM signal;

a first storage step of storing data obtained in said conversion step;

a first computation step of computing a phase difference between data at least one symbol before stored in said first storage step and data newly obtained in said conversion step;

a second storage step of storing phase difference data obtained in said first computation step;

a second computation step of further computing a phase difference between the phase difference data at least one symbol before stored in said second storage step and phase difference data newly computed in said first computation step;

an extraction step of extracting an I-axis component of phase difference data output in said second computation step;

a second extraction step of extracting phase difference data supposed to be pilot signals from the I-axis component extracted in said extraction step;

an addition step of performing cumulative addition of the phase difference data extracted in said second extraction step; and a control step of controlling the frequencies of carriers so that a calculation result obtained by said addition means is equal to or larger than a predetermined value.

* * * * *